(12) United States Patent
Ejzak

(10) Patent No.: US 9,357,373 B2
(45) Date of Patent: *May 31, 2016

(54) METHOD AND SYSTEM FOR IP MULTIMEDIA BEARER PATH OPTIMIZATION THROUGH A SUCCESSION OF BORDER GATEWAYS

(75) Inventor: Richard P. Ejzak, Wheaton, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 139 days.

This patent is subject to a terminal disclaimer.

(21) Appl. No.: 13/178,885

(22) Filed: Jul. 8, 2011

(65) Prior Publication Data
US 2011/0264909 A1    Oct. 27, 2011

Related U.S. Application Data

(63) Continuation of application No. 12/288,175, filed on Oct. 17, 2008.

(51) Int. Cl.
*H04L 12/28* (2006.01)
*G06F 15/16* (2006.01)
(Continued)

(52) U.S. Cl.
CPC ............... *H04W 8/082* (2013.01); *H04L 9/00* (2013.01); *H04L 61/2546* (2013.01); *H04L 65/1006* (2013.01); *H04L 65/1069* (2013.01); *H04W 80/10* (2013.01)

(58) Field of Classification Search
None
See application file for complete search history.

(56) References Cited

U.S. PATENT DOCUMENTS 6,625,652 B1    9/2003  Miller et al.
7,356,031 B1    4/2008  Toebes et al.
(Continued)

FOREIGN PATENT DOCUMENTS

CN    1902889    1/2007
CN    1317874    5/2007
(Continued)

OTHER PUBLICATIONS

RFC 1889, Schulzinne, et al., "RTP: A Transport Protocol for Real-Time Applications, Network Working Group", Jan. 1996.
(Continued)

*Primary Examiner* — Marsha D Banks Harold
*Assistant Examiner* — Christopher Wyllie
(74) *Attorney, Agent, or Firm* — Fay Sharpe LLP

(57) ABSTRACT

A method for identifying alternative end-to-end media paths through internet protocol realms using substitute session description protocol parameters is disclosed. The method includes receiving a session description protocol offer, including a list of internet protocol realms. The list may include any number of previously traversed through internet protocol realms and/or secondary internet protocol realms. The method continues with determining the outgoing internet protocol realm for a media path based on unspecified signaling criteria. Finally, the method includes that if the outgoing internet protocol realm to be traversed through is on the list of previously traversed through and/or secondary internet protocol realms, bypassing at least one border gateway associated with the incoming and previously traversed through internet protocol realms. The system implementing a method for identifying optimal end-to-end media paths and internet protocol multimedia subsystems includes a list of internet protocol realm instances and an application level gateway configured to receive a session description protocol offer having connection information and port information, and a procedure to determine that if the outgoing internet protocol realm that the media path may traverse through is on the list of instances, the media path connection information and port information is substituted to facilitate border gateway bypassing.

9 Claims, 7 Drawing Sheets

(51) Int. Cl.
| | |
|---|---|
| *H04W 8/08* | (2009.01) |
| *H04L 9/00* | (2006.01) |
| *H04L 29/12* | (2006.01) |
| *H04W 80/10* | (2009.01) |
| *H04L 29/06* | (2006.01) |

(56) References Cited

U.S. PATENT DOCUMENTS

| | | | |
|---|---|---|---|
| 7,472,411 | B2 | 12/2008 | Wing et al. |
| 7,710,869 | B1 | 5/2010 | Gleichauf et al. |
| 8,139,541 | B2* | 3/2012 | Ejzak .................. H04L 12/66 370/331 |
| 8,144,711 | B1 | 3/2012 | Pegrum et al. |
| 2002/0010799 | A1* | 1/2002 | Kubota et al. ................ 709/249 |
| 2002/0103919 | A1 | 8/2002 | Hannaway |
| 2002/0126667 | A1* | 9/2002 | Oguchi ......................... 370/389 |
| 2003/0028670 | A1* | 2/2003 | Lee ......................... H04L 45/02 709/241 |
| 2003/0115360 | A1* | 6/2003 | Edwin .................... H04L 45/12 709/240 |
| 2004/0158564 | A1* | 8/2004 | Collier et al. .................. 707/10 |
| 2005/0201304 | A1 | 9/2005 | Olshansky |
| 2005/0254482 | A1 | 11/2005 | Yeom |
| 2006/0072542 | A1 | 4/2006 | Sinnreich et al. |
| 2006/0088063 | A1* | 4/2006 | Hartung et al. .............. 370/498 |
| 2006/0203001 | A1 | 9/2006 | Van Der Stok et al. |
| 2006/0239261 | A1 | 10/2006 | Bell |
| 2006/0272009 | A1 | 11/2006 | Stott |
| 2007/0019619 | A1 | 1/2007 | Foster et al. |
| 2007/0094412 | A1* | 4/2007 | Sollee .......................... 709/245 |
| 2007/0097999 | A1 | 5/2007 | Yan |
| 2007/0101414 | A1 | 5/2007 | Wing et al. |
| 2007/0150773 | A1 | 6/2007 | Srivastava |
| 2007/0288639 | A1 | 12/2007 | Brown |
| 2008/0075114 | A1 | 3/2008 | Mo |
| 2008/0126541 | A1 | 5/2008 | Rosenberg et al. |
| 2008/0146208 | A1* | 6/2008 | Ejzak ..................... H04L 12/66 455/416 |
| 2008/0178289 | A1 | 7/2008 | Gearhart et al. |
| 2008/0219268 | A1* | 9/2008 | Dennison ............. H04L 12/4625 370/395.2 |
| 2008/2225850 | | 9/2008 | Oran et al. |
| 2008/0254795 | A1 | 10/2008 | Ratcliffe et al. |
| 2008/0298237 | A1 | 12/2008 | Dos Remedios et al. |
| 2009/0010270 | A1* | 1/2009 | Ejzak ................ H04L 29/12452 370/401 |
| 2009/0094692 | A1 | 4/2009 | Ono et al. |
| 2009/0172170 | A1 | 7/2009 | Rey |
| 2010/0014518 | A1 | 1/2010 | Duncan et al. |
| 2010/0061228 | A1 | 3/2010 | Grabelsky et al. |
| 2010/0098093 | A1* | 4/2010 | Ejzak .................... H04L 61/2546 370/401 |
| 2010/0142412 | A1* | 6/2010 | Synnergren et al. .......... 370/261 |
| 2011/0264909 | A1* | 10/2011 | Ejzak .................... H04L 61/2546 713/153 |

FOREIGN PATENT DOCUMENTS

| | | | | |
|---|---|---|---|---|
| WO | WO 2005/046182 | * | 5/2005 | ............ H04L 29/12 |
| WO | WO2005046182 | A1 | 5/2005 | |

OTHER PUBLICATIONS

Source: Stuart Walker, Leapstone Systems, Inc., Multiservice Switching Forum Contribution; IA for Roaming Between MSF R3 Networks.
Acme Packet Session Border Controller Net-Net SD Technical Overview, Version 3.4.
English Bibliography for Chinese Patent No. 1902889, published May 23, 2007, Printed from Thomson Innovation on Jun. 20, 2012 (3 pages).
English Bibliography for Chinese Patent Application Publication No. 1317874, published May 23, 2007, Printed from Thomson Innovation on Jun. 20, 2012 (2 pages).
Aoun, et al., "Identifying intra-realm calls and avoiding media tromboning" IETF Standard-Working-Draft, Internet Engineering Task Force, IETC, CH, Jan. 1, 1900, XP015000106, ISSN: 0000-0004, 9 pages.
Acme Packet Proprietary & Confidential, Acme Packet session Border Controller Net-Net SD Technical Overview; Version 3.4, Sep. 2004.
Multiservice Switching Forum Contribution, IA for Roaming between MSF R3 networks, Jul. 2, 2007, p. 1-31.
Rosenberg, J. and H. Schulzrinne, "An Offer/Answer Model with Session Description Protocol (SDP)", RFC 3264, Jun. 2002.
"Trust Domain" RFC 3325, Jennings, C., Peterson, J. and Watson, M., "Private Extensions to the Session Initiation Protocol (SIP) for Asserted Identity within Trusted Network", Nov. 2002.
Handley, M., Jacobson, V. and Perkins, C., "SDP: Session Description Protocol", RFC 4566, Jul. 2006.
Crocker, D. and P. Overell, "Augmented BNF for Syntax Specifications: ABNF", RFC 4234, Oct. 2005.
Jennings, C., Peterson, J. and Watson, M., "Private Extensions to the Session Initiation Protocol (SIP) for Asserted Identity within Trusted Network", RFC 3325, Nov. 2002.
Bradner, S., "Key words for use in RFCs to Indicate Requirement Levels", BCP 14, RFC 2119, Mar. 1997.
Rosenberg, J., Schulzrinne, H., Camarillo, G., Johnston, A., Peterson, J., Sparks, R., Handley, M. and E. Schooler, "SIP: Session Initiation Protocol", RFC 3261, Jun. 2002.
Huitema, C., "Real Time Control Protocol (RTCP) attribute in Session Description Protocol (SDP)", RFC 3605, Oct. 2003.
Rosenberg, J., "Obtaining and Using Globally Routable User Agent (UA) URIs (GRUU) in the Session Initiation Protocol (SIP)", draft-ietf-sip-gruu-15 (work in progress), Oct. 2007.
Mayrhofer, A. and Spanring, C., "A Uniform Resource Identifier for Geographic Areas ('geo' URI)", draft-mayrhofer-geopriv-geo-uri (work in progress), May 2008.
Rivest, R., "The MD5 Message-Digest Algorithm", RFC 1321, Apr. 1992.
Borella, M., Lo, J., Grabelsky, D., and G. Montenegro, "Realm Specific IP: Framework", RFC 3102, Oct. 2001.
Borella, M., Grabelsky, D., Lo, J., and K. Taniguchi, "Realm Specific IP: Protocol Specification", RFC 3103, Oct. 2001.
Senie, D., "Network Address Translator (NAT)-Friendly Application Design Guidelines", RFC 3235, Jan. 2002.
Srisuresh, P., Kuthan, J., Rosenberg, J., Molitor, A., and A. Rayhan, "Middlebox communication architecture and framework", RFC 3303, Aug. 2002.
Rosenberg, J., Weinberger, J., Huitema, C., and R. Mahy, STUN—Simple Traversal of User Datagram Protocol (UDP) Through Network Address Translators (NATs), RFC 3489, Mar. 2003.
Schulzrinne, H., Casner, S., Frederick, R., and V. Jacobson, "RTP: A Transport Protocol for Real-Time Applications", RFC 3550, Jul. 2003.
Rosenberg, J., Peterson, J., Schulzrinne, H., and G. Camarillo, "Best Current Practices for Third Party Call Control (3pcc) in the Session Initiation Protocol (SIP)", BCP 85, RFC 3725, Apr. 2004.
Kohler, E., Handley, M., and S. Floyd, "Datagram Congestion Control Protocol (DCCP)", RFC 4340, Mar. 2006.
Rosenberg, J., "Interactive Connectivity Establishment (ICE): A Protocol for Network Address Translator (NAT) Traversal for Offer/Answer Protocols", draft-ietf-mmusic-ice-19 (work in progress), Oct. 2007.
Rosenberg, J., "Session Traversal Utilities for (NAT) (STUN)", draft-ietf-behave-rfc3489bis-18 (work in progress), Jul. 2008.
Rosenberg, J., "Traversal Using Relays around NAT (TURN): Relay Extensions to Session Traversal Utilities for NAT (STUN)", draft-ietf-behave-turn-09 (work in progress), Jul. 2008.
Franks, J., Hallam-Baker, P., Hostetler, J., Lawrence, S., Leach, P., Luotonen, A. and L. Stewart, "HTTP authentication: Basic and Digest Access Authentication", RFC 2617, Jun. 1999.
Network Address Translators (NATs), RFC 3489, Mar. 2003.
3GPP "TS 23.228: IP Multimedia Subsystem (IMS); Stage 2 (Release 8)", 3GPP 23.228, Jul. 2008, ftp://ftp.3gpp.org/specs/archive/23_series/23.228/.
3GPP "TS 24.229: IP Multimedia Call Control Protocol based on SIP and SDP; Stage 3 (Release 8)", 3GPP 24.229, Jul. 2008, ftp://ftp.3gpp.org/specs/archive/24_series/24.229/.

\* cited by examiner

METHOD AND SYSTEM FOR IP MULTIMEDIA BEARER PATH OPTIMIZATION THROUGH A SUCCESSION OF BORDER GATEWAYS

This application is a continuation of U.S. patent application Ser. No. 12/288,175, filed on Oct. 17, 2008.

INCORPORATION BY REFERENCE

Attention is directed to a co-pending application, U.S. application Ser. No. 11/774,369, entitled "A METHOD AND APPARATUS FOR INTERNET PROTOCOL MULTIMEDIA BEARER PATH OPTIMIZATION THROUGH A SUCCESSION OF BORDER GATEWAYS," the disclosure of which is hereby incorporated by reference in its entirety. The appropriate components and processes of the above co-pending application may be selected for the teaching and support of the present application in embodiments thereof.

BACKGROUND OF THE DISCLOSURE

This invention relates to an improved method and system for bearer path optimization through a succession of border gateways in an Internet Multimedia Subsystem (IMS) network. More particularly, this invention relates to a method and apparatus for identifying alternative end-to-end media paths through Internet Protocol (IP) realms using substitute Session Description Protocol (SDP) parameters.

While the invention is particularly directed towards IP multimedia bearer path optimization and thus will be described with specific reference thereto, it will be appreciated that the invention may have other usefulness in other fields and applications. For example, this invention may be used in a variety of data transfer systems and methods including other systems and methods that utilize the SDP and the SDP offer/answer model. This method and system will allow Session Initiation Protocol (SIP) based networks to bypass one or more border gateways that would otherwise be included in the media path.

By way of background, the IMS/SIP based network is an internet protocol based network that supports many types of user equipment. This user equipment uses Voice over Internet Protocol (VoIP) and other methods to transfer data and voice in real time applications across the IP network. A SIP based network call has a call signaling path and a bearer path. The call signaling path handles call control data which is used to set-up, connect and process the call. The bearer path is the voice data connection over which a conversation takes place, and is also referred to as a multimedia session path or media path.

In IMS and other SIP-based networks, border gateways are deployed between IP realms defined by each network. Within an IP realm every IP endpoint is reachable from every other IP endpoint using a common IP address space. The border gateways provide security to the IP realm by limiting access to the IP endpoints within an IP realm. The media path associated with a multimedia stream may traverse an arbitrary number of IP realms along an end-to-end media path. When a border gateway has access to additional IP realms on the path, there is an opportunity to create a shorter media path.

Therefore, there is a need in the industry to allow for improved border gateway bypass procedures. There is further need in the industry to allow border gateway bypass procedures that require no additional signaling messages beyond what is needed for a single end-to-end Session Description Protocol (SDP) offer/answer transaction and that require no new procedures in session IP endpoints. There is a further need in the industry to allow border gateways to protectively manage security and aggregate bandwidth usage for all sessions. Finally, there is a need in the industry to supply an optimization procedure which shortens the route that a bearer path must take, thereby freeing resources of border gateways, reducing bearer traffic through IP networks, and minimizing end-to-end delay, thus improving Quality of Service (QoS).

The present invention contemplates a new and improved system and method that resolves the above-referenced difficulties and others.

SUMMARY OF THE INVENTION

An improved system and method for bearer path optimization through a succession of border gateways is provided. The invention will allow for Application Layer Gateways (ALG) to attach additional connectivity information to SDP messages that can be recognized by other ALGs on the path. This will allow for identification of extraneous border gateways on the media path and the substitution of connectivity information in the SDP messages to bypass these extraneous border gateways. This invention will also identify alternative media paths using precise SDP parameter substitution procedures which will in turn correctly construct a new optimized end-to-end media path.

In one aspect of the invention, a method for identifying alternative end-to-end media paths through internet protocol realms using substitute session description protocol parameters is provided. The method comprises: receiving a message including a list of internet protocol realms, wherein the list includes at least one of previously traversed through Internet protocol realm and secondary internet protocol realm; determining the outgoing internet protocol realm for a media path based at least in part on session initiation protocol signaling information; if the outgoing internet protocol realm is on the list of internet protocol realms, bypassing at least one border gateway associated with at least one of the internet protocol realms on the list.

In accordance with yet another aspect of the invention, a method for identifying alternative end-to-end media paths through internet protocol realms using substitute session description protocol parameters is provided. The method comprises: receiving a message including a list of internet protocol realms, wherein the list includes at least one of a previously traversed through internet protocol realm and a secondary internet protocol realm; and if an internet protocol realm on the list of internet protocol realms is reachable from a controlled border gateway, bypassing at least one border gateway associated with the previously traversed through internet protocol realms or secondary internet protocol realms.

In yet another aspect of the invention, a system for identifying an optimal end-to end media path in internet protocol multimedia subsystems is provided. The system comprises: a list including information identifying at least one of an internet protocol realm that a media path has traversed through and a secondary internet protocol realm in order to establish a call; and an application level gateway configured to receive a session description protocol offer/answer having connection and port information, determine the outgoing internet protocol realm that the session description protocol offer/answer may traverse through, examine the list, and if the outgoing internet protocol realm matches an Internet protocol realm that the media path has traversed through or a secondary internet protocol realm on the list, substitute the connection and port information to facilitate a border gateway bypass.

In yet another aspect of the invention, a method of identifying an end-to end media path in internet protocol multimedia subsystems is provided. The method comprises: establishing a list of internet protocol realms, wherein the list includes at least one of a previously traversed through internet protocol realm and a secondary internet protocol realm; receiving a session description protocol message having connection and port information; determining the outgoing internet protocol realm that the media path may traverse through; examining the list for the outgoing internet protocol realm that the media path may traverse through; and if the outgoing internet protocol realm matches an internet protocol realm that the media path has traversed through or a secondary internet protocol realm on the list, substituting the connection information and the port information in the session description protocol message in order to facilitate a bypass of at least one border gateway.

In yet another aspect of the invention, a method for identifying alternative end-to-end media paths through internet protocol realms using substitute session description protocol parameters is provided. The method comprises: receiving a session description protocol offer including a list of internet protocol realms, wherein the list includes at least one of a previously traversed through internet protocol realm and a secondary internet protocol realm; contacting a target application layer gateway via a globally reachable user agent uniform resource identifier to establish an alternate media path; determining that the alternate media path will significantly improve the end-to-end media path; and manipulating a session description protocol answer to insert the alternate media path.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The presently described embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
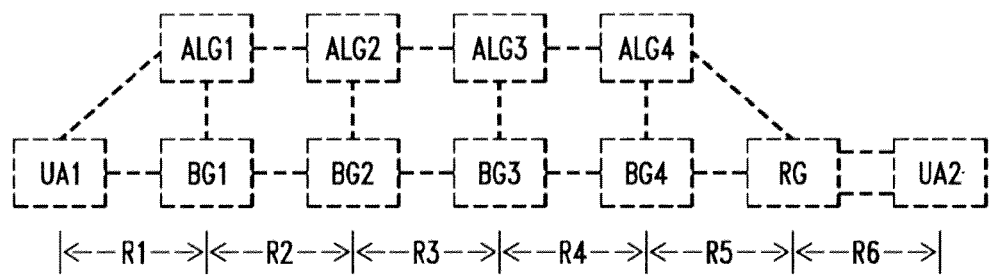
FIG. 1 illustrates a portion of the overall communication network system including a plurality of user agent endpoints, a plurality of ALGs, a plurality of border gateways and a plurality of IP realms.

The following acronyms are used herein:
3GPP—the Third Generation Partnership Project
3 pcc—Third Party Call Control
ALG—Application Layer Gateway
BG—Border Gateway
DCCP—Datagram Congestion Control Protocol
FQDN—Fully Qualified Domain Name
GRUU—Globally Reachable UA URI
ICE—Interactive Connectivity Establishment
IMS—Internet Protocol Multimedia Subsystem
IP—Internet Protocol
IPSEC—IP Security
IPv4—IP Version 4
IPv6—IP Version 6
LAN—Local Area Network
MD5—Message-Digest 5 Algorithm
NAT—Network Address Translation
NAPT—Network Address Port Translation
RG—Residential Gateway
RTCP—RTP Control Protocol
RTP—Real-time Transport Protocol
SDP—Session Description Protocol
SIP—Session Initiation Protocol
SP—Space
STUN—Simple Traversal Underneath NAT
TCP—Transport Control Protocol
UA—User Agent
UDP—User Datagram Protocol
URI—Uniform Resource Identifier Overview of Operation Referring now to the drawings wherein the showings are for purposes of illustrating the disclosed embodiments only and not for purposes of limiting the same, FIG. 1 provides an overall view of the system into which the present invention may be incorporated. A communications infrastructure A includes a typical call configuration between user agent endpoints UA1 and UA2, where the SIP signaling goes between the UAs via at least one Application Layer Gateway (ALG1, ALG2, ALG3 and ALG4 are shown) and other SIP servers not shown, and one RTP multimedia stream goes between the UAs via the Border Gateways (BG1, BG2, BG3 and BG4) and possibly a Residential Gateway associated with each UA (only one RG is shown associated with UA2). Each BG is controlled by its corresponding ALG. R1, R2, etc., in the figure represent the IP realms associated with each segment of the media path. It should be understood that this represents but one embodiment of the communications network infrastructure. The present invention could be incorporated in a variety of communication network configurations.

In operation as discussed in greater detail below, the presently described embodiments are directed towards IP multimedia bearer path optimization through bypassing of border gateways. The invention describes a solution that uses a system of cooperating network elements in order to identify when a border gateway can be bypassed for a more efficient media flow. This invention may be incorporated by networks based on protocol using SDP messaging such as IMS of the third generation partnership project (3GPP), which is based on SIP.

The VoIP telephones used in the infrastructure A may be co-located with the user agent, or may be separate. In most of the cases, the telephone's native IP capability enables the co-location model. When they are separate, the user agent is usually co-located with a signaling gateway to other networks such as the Public Switched Telephone Network (PSTN). In this case, the telephones are generally connected to the signaling gateway via the PSTN.

It is to be understood, however, that other user equipment besides VoIP telephones may be substituted. Other examples of user equipment include, but are not limited to, wireless multimedia telephones, mobile telephones, wireline telephones, laptop computers, WiFi phones, WiMax phones, etc. These devices are typical user equipment used to communicate through compatible lines.

Through this invention a call may be processed through the user equipment to the IMS. FIG. 1 shows a typical call configuration between IP endpoints UA1 and UA2. SIP signaling goes between the UAs via at least one ALG and a variety of other SIP servers, which are not shown. The Real time Transport Protocol (RTP) multimedia flow goes between UA1 and UA2 via the border gateways (BG1-BG4) and optionally via a residential gateway RG associated with one or both of the user agents. Each border gateway is controlled by its corresponding ALG. The IP realms R1-R6 in FIG. 1 are associated with each segment of the multimedia session path. The border gateways BG1-BG4 and the RG act as IP endpoints and access points for the corresponding IP realms. Each border gateway has access to at least the two corresponding IP realms.

The IMS and other SIP networks have the option to deploy border gateways between the IP realms defined by each network. Within an IP realm every IP endpoint is reachable from any other IP endpoint using a common IP address space. Each border gateway typically provides a firewall or Network Address Port Translator (NAPT) to limit access to IP endpoints within a realm. An Application Layer Gateway (ALG) controls each border gateway to allocate new IP addresses and transport protocol ports as necessary for each SDP media line and updates the SDP connection and port information in each forwarded SDP offer and SDP answer to effectively insert the border gateway into each end-to-end multimedia stream.

The media path associated with a multimedia stream may traverse an arbitrary number of IP realms between session IP endpoints. As long as each border gateway in the media path has no connection to IP realms on the media path other than its two directly connected IP realms, there is no option to optimize the media path using the allocated border gateway resources. But if either IP endpoint or any border gateway on the path has direct access to one of the other IP realms on the path, then a shorter media path exists.

A sequence of ALGs implementing the procedures herein, where each ALG can determine the IP address and port information for entities on the media path in its interconnected IP realms, will be able to establish a media path with the minimum number of border gateways without compromising any of the access controls associated with the border gateways on the path. If one or more ALGs on the signaling path do not implement the procedures then border gateway bypass can still occur but some potentially bypassable border gateways may remain in the media path.

The procedures described herein also include an "active-bypass" option to attempt to find a shorter media path segment between existing border gateways associated with the path. This option requires additional SIP signaling to establish a SIP dialog for each alternate media path segment candidate, whereas the base algorithm works by adding information to existing SDP offer/answer messages. Due to this additional signaling overhead, this option should only be used when it can be determined that dramatic improvement is possible for a media path segment.

This extension also works with hosted NAPT traversal schemes to establish a direct media path between IP endpoints within the same IP realm.

RFC 3264, Rosenberg, J. and H. Schulzrinne, "An Offer/Answer Model with Session Description Protocol (SDP)", June 2002, describes the SDP offer/answer model, which enables SIP networks to establish end-to-end media paths for the multimedia streams in each session. Described herein are two SDP extension attributes and some extensions to ALG procedures for forwarding SDP offers and SDP answers. ALGs on the path manipulate the SDP as necessary within a single end-to-end SDP offer/answer transaction to enable establishment of an end-to-end media path with the minimum of border gateways. The SDP extension attribute describes media connection and port information for each IP realm on the path that is a candidate to bypass one or more border gateways on the path.

This invention describes an extension and optimization of the ALG approach to NAPT traversal. Other options for NAPT traversal include the Middlebox Control Protocol, Simple Traversal Underneath NAT (STUN) and its revision, the STUN Relay Usage, and Realm Specific IP. The most recent and comprehensive approach to NAPT traversal is Interactive Connectivity Establishment (ICE), which uses STUN to identify candidate addresses for NAPT traversal for media streams established by the offer/answer model.

While an ALG approach may require the insertion of a SIP back-to-back user agent (B2BUA) to modify SDP whenever a border gateway is inserted in the media path, ICE also has several disadvantages. ICE requires the deployment of STUN servers in each IP realm, a means of advertising the location of available STUN servers to SIP endpoints, extra signaling to discover candidate addresses for inclusion in SDP offers and answers, extra signaling to communicate the selected connection information, and implementation of the ICE procedures in the endpoints. With ICE, border gateways must be configured to allow signaling between endpoints and STUN servers, and do not receive definitive information on which ones are actually used and which remote addresses will be used in the RTP stream. This makes it difficult for border gateways to limit access to known IP source addresses and to predict bandwidth usage, which are two important reasons for deploying border gateways.

The border gateway bypass procedures described herein avoid the requirement to deploy STUN servers, require no additional signaling beyond what is needed for a single end-to-end SDP offer/answer transaction (although an optional procedure does generate additional signaling), require no new procedures to be supported by endpoints, allow border gateways to limit access to known IP source addresses, and allow border gateways to predictably manage aggregate bandwidth usage for all sessions.

Since this extension does not incorporate end-to-end connectivity checks of the media path, it takes advantage of accurate provisioning of the IP realms.

The use of this extension is generally applicable inside a "Trust Domain" as defined in RFC 3325, Jennings, C., Peterson, J. and Watson, M., "Private Extensions to the Session Initiation Protocol (SIP) for Asserted Identity within Trusted Network", November 2002. Nodes in such a Trust Domain are explicitly trusted by its users and end-systems to inspect and manipulate SDP messages as necessary to traverse and/or bypass firewalls and NATS while limiting access from unauthorized sources to endpoints in IP realms associated with the Trust Domain.

Since the procedures described herein include an option to cryptographically certify the candidate connection and port information from each IP realm, they can be used under some circumstances when the signaling traverses non-trusted networks or the Internet at large.

This extension requires that ALGs on the signaling path have the ability to access and manipulate SDP messages, which is inconsistent with the general recommendation that these messages be encrypted and integrity protected end-to-end.

In the interest of algorithmic simplicity, this extension finds improved media paths in most cases according to the available information but not necessarily the shortest possible paths under all circumstances.

An example deployment would be an IMS network using border gateways to control multimedia sessions with other networks.

The media path for each multimedia stream between the UAs is established via an end-to-end SDP offer/answer exchange where each ALG may choose to modify the connection and port information associated with each media line in the SDP to insert its BG in the media path according to normal ALG procedures. Each ALG may also perform the base algorithm procedures to identify when one or more BGs and/or RGs can be bypassed and to modify the forwarded SDP messages to implement the corresponding changes in the media path to bypass the BGs.

Figure 2:
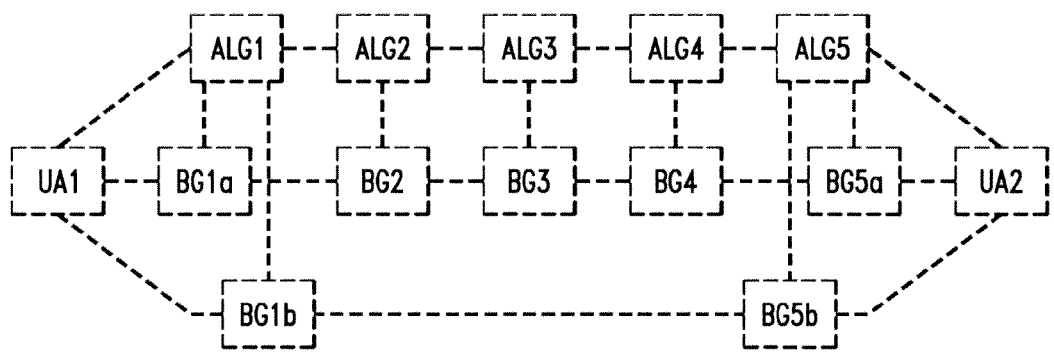
FIG. 2 illustrates an example configuration using secondary BGs.

FIG. 2 shows another example call configuration where secondary BGs are used to establish a media path with fewer BGs. ALG1 through ALG5 initially allocate BG1a, BG2, BG4, BG4 and BG5a as ALGs forward the initial SDP offer towards UA2 from UA1. These BGs enable traversal of unique IP realms R1 through R6 (not labeled in the figure). Since these BGs do not create any loop in the media path, there is no possibility to bypass any of them if the algorithm is limited to finding loops in a fixed media path.

While forwarding the initial SDP, if an ALG along the way, such as ALG1, controls BG(s) that have access to IP realm(s) other than those IP realms that it controls on the default media path (i.e., not R1 or R2), then the ALG can advertise its ability to access additional IP realm(s) by including information about them in the forwarded SDP.

If a subsequent ALG (e.g., ALG5) determines that it controls a BG (e.g., BG5b) that has a direct connection to an IP realm accessible from a BG controlled by a previous ALG in the path (e.g., ALG1 and BG1b), then the ALG may choose to use this alternative media path if it appears to be an improvement over the initial path. In this example, the algorithm establishes an alternative media path from UA1 to UA2 via BG1b and BG5b while significantly reducing the number of BGs traversed. Note that the IP realm between BG1b and BG5b in the example (R7) will not match any of the IP realms R1 through R6. If the connections exist, the algorithm may also generate alternative paths either via BG1a and BG5b, via BG1b and BG5a, or via BG1a and BG5a, for example (not shown).

The border gateway bypass base algorithm and active-bypass option assume ICE is not used by any entity in the architecture, although hybrid procedures are possible.

It is assumed that the UAs participate in standard SDP offer/answer negotiation by presenting standard connection and port information for each media line according to RFC 4566, Handley, M., Jacobson, V. and Perkins, C., "SDP: Session Description Protocol", July 2006, RFC 3264, Rosenberg, J. and H. Schulzrinne, "An Offer/Answer Model with Session Description Protocol (SDP)", June 2002, and possibly other extensions. If necessary, the ALGs may use the rtcp attribute defined in RFC 3605, Huitema, C., "Real Time Control Protocol (RTCP) attribute in Session Description Protocol (SDP)", October 2003, to identify an RTCP port not using the expected default value.

The border gateway bypass base algorithm and active-bypass option are generally implemented within the ALGs. The procedures have little or no impact on any aspect of SDP offer/answer negotiation other than the connection and port information associated with each media line.

This invention defines an SDP extension attribute "visited-realm" that provides connection and port information for a prior IP realm traversed through on the signaling path. Each instance of visited-realm has an instance number, realm identifier, connection and port data, and optional cryptographic signature computed using an algorithm private to each IP realm so as to ensure the integrity of the visited-realm data.

This invention also defines an SDP extension attribute "secondary-realm" that provides connection and port information for secondary IP realms associated with the signaling path. The secondary-realm attribute includes the same types of information as the visited-realm attribute.

Note that the connection and port information in each SDP offer/answer transaction within a SIP dialog may be handled the same way, as described herein, re-allocating and de-allocating BGs as necessary with each SDP offer/answer transaction to accommodate any potential changes in the IP realms associated with the session IP endpoints.

Overview of Operation of the Active-Bypass Option

Figure 3:
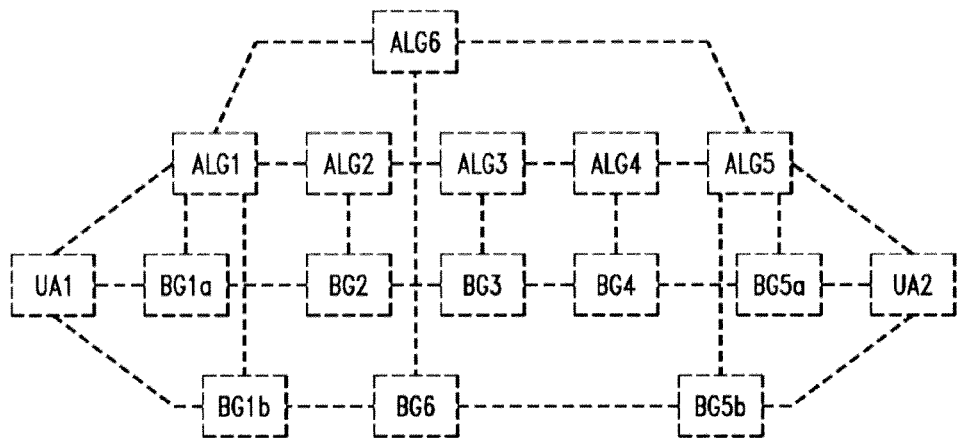
FIG. 3 illustrates an example configuration with Active-Bypass Option.

FIG. 3 shows an example of the use of the base algorithm with the active-bypass option. If the initial BG allocations traversing IP realms R1 through R6 do not offer an opportunity to bypass any BGs (as in FIG. 2), and if no connections exist to offer any of the alternative options available in the base algorithm, then the active-bypass option can discover additional alternative(s). Note that in this case BG1b and BG5b do not share a common IP realm (in fact, all of the IP realms are different in this example), so the active-bypass option creates a new signaling path via ALG6 to establish a new media path segment via BG6.

When implementing the active-bypass option, the following additional information may be included in each visited-realm and secondary-realm attribute generated by the base algorithm for an SDP offer, if available: the approximate geo-location of the corresponding BG; the approximate delay of IP packets on the previous media path segment between this BG and the immediately preceding BG or endpoint; the approximate packet loss rate on the same media path segment; and if the ALG is reachable via a globally unique host name, then a globally reachable address of the ALG with a unique instance id for the corresponding SIP dialog and media line, in the form of a temporary GRUU.

Each ALG should include the geo-location, delay and loss information in the first visited-realm attribute generated for an SDP offer, and may include them for other visited-realm or secondary-realm attributes if the information differs significantly from the first. Each ALG may include the GRUU in the first visited-realm attribute generated for a media line in an SDP offer. There is no need to repeat the GRUU in subsequent visited-realm or secondary-realm attributes for the same media line.

When processing the SDP answer in the second phase of the base algorithm, after determining which BGs (if any) are to be bypassed as a result of the base algorithm, each ALG that still controls a BG determines if there is the possibility that a significantly shorter media path segment can be established via another ALG reachable via a GRUU. Each ALG makes this determination based on the available geo-location, delay and packet loss information associated with each BG and media path segment.

If an ALG determines that it may be able to establish a shorter media path segment, the ALG (e.g., ALG5) sends a SIP INVITE request to the "best" ALG reachable via a GRUU (e.g., ALG1) to establish a separate dialog and corresponding alternate media path segment (e.g., via ALG6 and BG6). If the ALG is successful in establishing the alternate media path segment and it appears to be significantly better than the corresponding one determined by the base algorithm, then the ALGs instruct the BGs to insert the shorter path segment into the overall media path.

Figure 4:
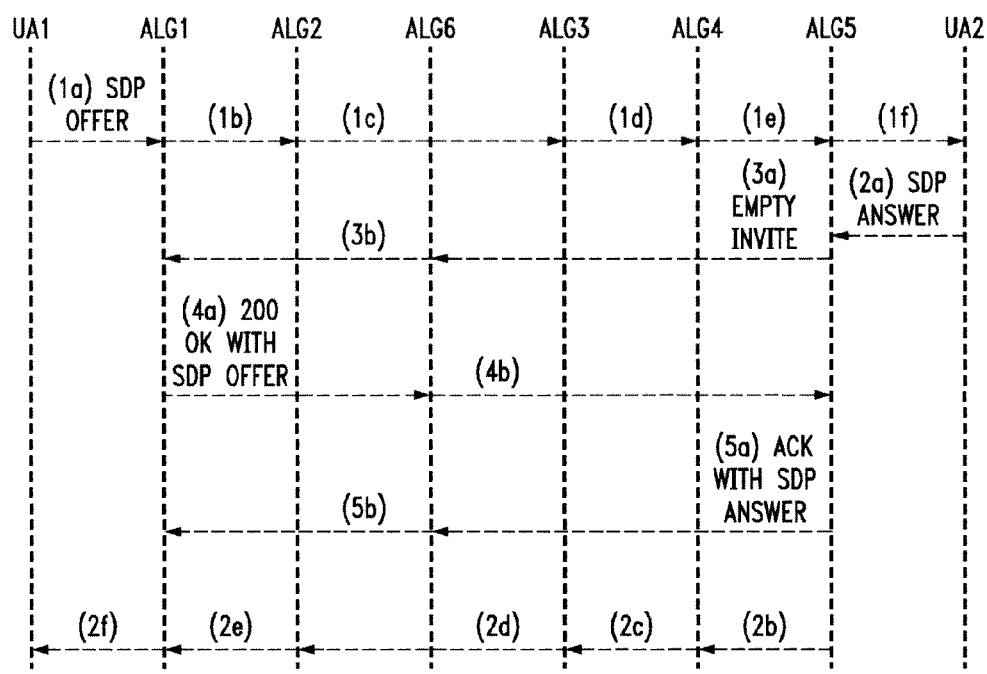
FIG. 4 shows a call flow that corresponds to the configuration in FIG. 3.

FIG. 4 shows a call flow that corresponds to the configuration in FIG. 3. Steps 1a to 1f describe the progression of SDP offers via the ALGs from UA1 to UA2 and steps 2a to 2f describe the corresponding progression of SDP answers according to the base algorithm. After step 2a, ALG5 determines that it may be able to establish a shorter media path segment via ALG1 and sends an empty SIP INVITE request to ALG1 via ALG6 in steps 3a and 3b. Steps 4a, 4b, 5a and 5b describe a new SDP offer/answer transaction between ALG1 and ALG5 via ALG6 which attempts to establish an alternate media path segment. If an alternate media path segment is successfully established and is a significant improvement, ALG5 signals the selection of the alternate media path segment to ALG1 in steps 2b through 2e. ALG1 incorporates the alternate media path segment into the media path for the primary dialog before forwarding the final SDP answer to UA1 in step 2f.

IP Realm Considerations

For the procedures described herein, the term "IP realm" has a specific meaning beyond the use of the term "realm" for digest authentication. An IP realm has two purposes: (1) to identify a private means by which network entities sharing private information can verify that data communicated via intermediaries remains unchanged; and (2) to identify when one network entity is reachable from another via a fully interconnected common IP address space.

The syntax for the visited-realm and secondary-realm extension attributes defined later clearly describes means of accomplishing purpose (1) using security credentials.

There are many network configurations for which purpose (2) is applicable, as described below.

For example, all hosts in a residence on a private LAN behind an RG/NAPT can be considered to be in their own IP realm, as is the case for R6. An operator providing hosted NAPT traversal from an ALG in the network can identify a separate IP realm for each such residence and provide the security framework to ensure, for example, that it is possible to provide a media path directly between hosts in the same residence when they are involved in an end-to-end session established via SIP servers in an external network, thus bypassing a potentially significant number of BGs that would otherwise have been allocated using normal ALG procedures.

A very similar example is when there is a private enterprise network using a private IP address space with one or more NAPTs to external networks. The same principles apply as in the residential case. An ALG providing hosted NAPT traversal creates an IP realm for the enterprise, associates the appropriate IP addresses from the enterprise IP realm with a selected identifier and looks for opportunities to bypass BGs in the network.

Session endpoints not associated with NAPTs may also be directly connected to an ALG in the network. Those mutually reachable endpoints connected to an ALG may be assigned an IP realm.

Once a media path enters a network isolated with ALGs from access and peer networks, all addresses associated with media connections to BGs that are mutually reachable within the network can be considered part of another IP realm. Whenever an ALG forwards an SDP offer back into such an IP realm after traversing through it on a prior hop, there is an opportunity to bypass all BGs traversed through on the "loop" back into the IP realm.

Two interconnected networks may have ALG/BGs directly connected via IPSEC associations over the Internet. There may be one or more IP realms created just to identify these limited connectivity options. Since there will be limited opportunities to bypass BGs via these IP realms, a network may choose to leave these IP realms unidentified and may choose not to forward visited-realm or secondary-realm information for these IP realms.

IP addresses reachable from the open internet are associated with the pre-defined IP realm "IN".

These are just a few examples of IP realms. Since no connectivity checks are used to verify reachability, IP realms may be provisioned to correctly identify mutually reachable IP addresses. Networks may provide other means to verify reachability between IP endpoints in their defined IP realms.

ALG Procedures

The ALG procedures described below shall apply separately to each media line with non-zero port value in each SDP message and apply separately to each SDP offer/answer transaction.

ALG Handling of SDP Offer

Figure 5:
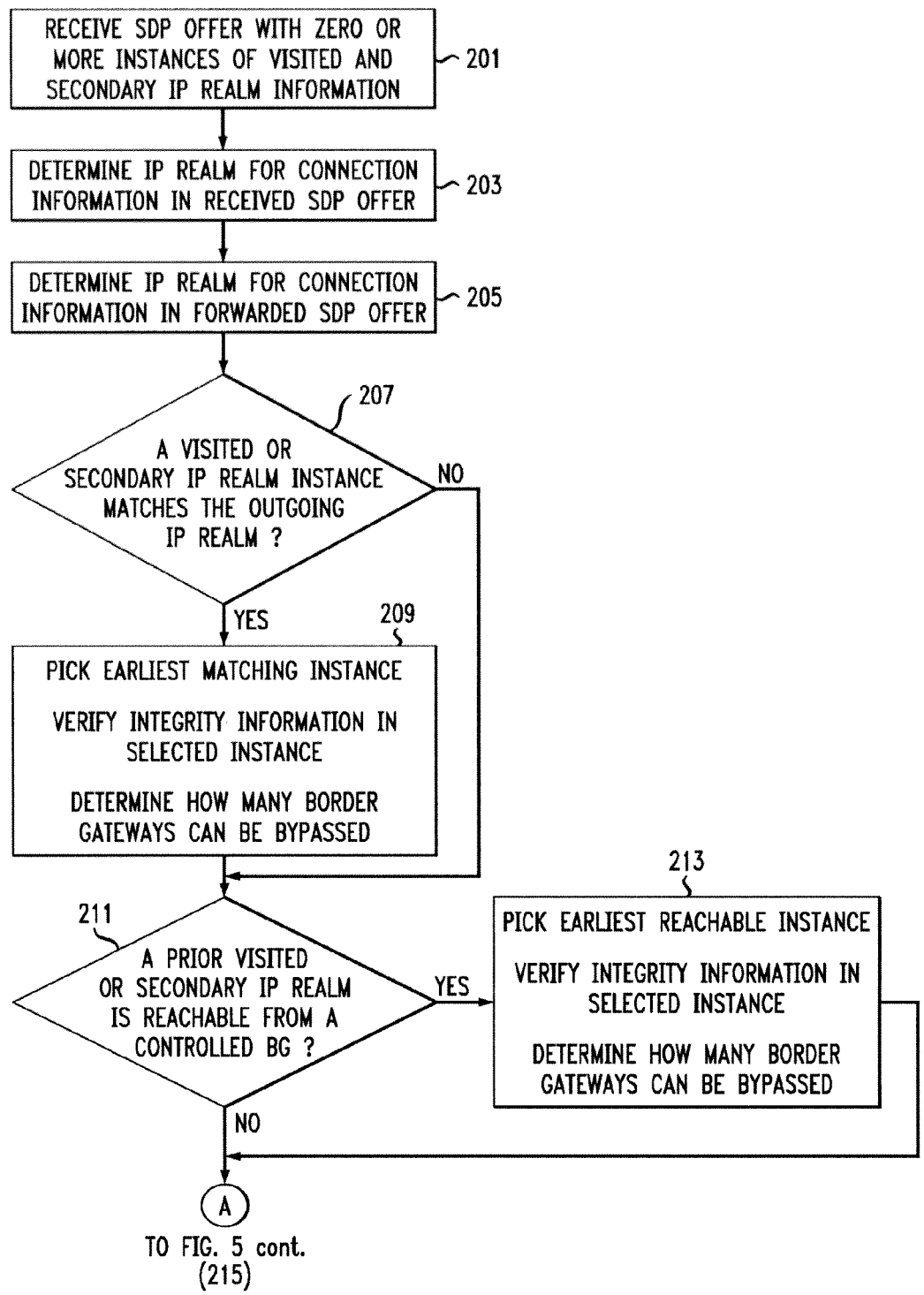
FIG. 5 is a flow diagram illustrating one embodiment of the method according to the present invention.
Figure 5:
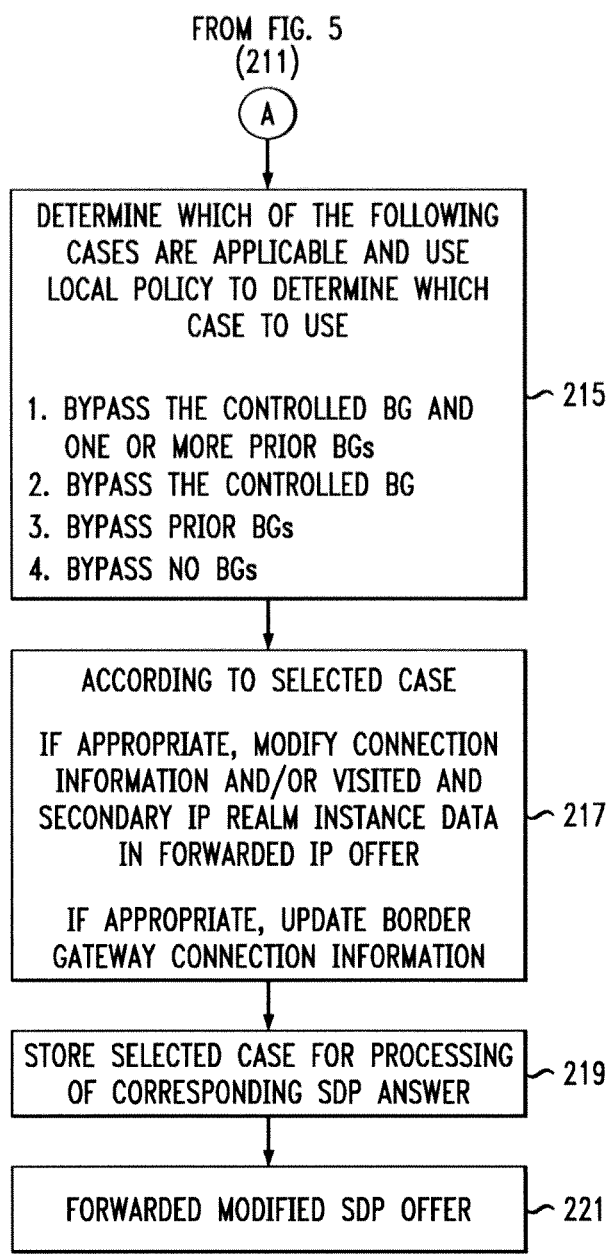

FIG. 5 is a flow chart illustrating the ALG processing of the SDP offer in the base algorithm. Generally, in this example, the method takes place in the ALG, however, it should be appreciated that this method may take place in a variety of hardware and/or software configurations.

When an ALG receives an SDP offer from a UA or another ALG (at step 201), it first determines the IP realm for the segment of the media path associated with the outgoing signaling (at step 203 and step 205). For example, in FIG. 1, if UA1 initiates an SDP offer towards UA2, then the outgoing IP realm for ALG1 is R2, the outgoing IP realm for ALG2 is R3, and the outgoing IP realm for ALG4 is R6 (rather than R5). Since ALG4 is managing the traversal of the RG to R6, BG4 and IP realm R5 are not eligible for bypass unless both media path IP endpoints are in the same IP realm R6, so that all BGs and RGs in the media path are bypassed.

The ALG examines all previously traversed through IP realms represented by the visited-realm and secondary-realm instances for the media line in the received SDP offer (at step 207). If the outgoing IP realm matches any of visited-realm or secondary-realm instances, then the ALG can bypass one or more BGs, including the one it controls. The ALG should select the earliest matching IP realm and determine the number of BGs that can be bypassed by substituting the connection and port information from this earliest IP realm into the forwarded SDP offer (at step 209).

The ALG then determines if a BG under its control has access both to the outgoing IP realm and to an IP realm associated with a prior visited-realm or secondary-realm instance in the received SDP offer (at step 211). In this case the ALG may be able to bypass one or more BGs, but not the one it controls. The ALG should select the earliest IP realm accessible from a BG under its control and determine the number of BGs that can be bypassed by connecting the prior IP realm directly to the BG (at step 213). Note that in this case use of a visited-realm instance associated with the immediately prior ALG is pointless since no BGs are bypassed. Also note that in this case use of a secondary-realm instance associated with the immediately prior ALG will not reduce the number of BGs in the path, but may still result in a superior media path if, for example, it can be determined that there is less IP layer congestion using this path.

The ALG shall then select one of the following four cases depending on applicability and local policy (at step 215):

1. Bypass the controlled BG and one or ore prior BGs.
2. Bypass the controlled BG.
3. Bypass prior BGs.
4. Bypass no BGs.

The most common local policy will be to select the case that bypasses the largest number of BGs. In cases 3 and 4, the ALG may signal that it is not to be bypassed by removing all visited-realm and secondary-realm instances associated with prior IP realms from the forwarded SDP offer. The ALG should signal that it is not to be bypassed if it performs any necessary media function other than address translation, e.g., transcoding.

SDP Offer Case 1: Bypass Controlled BG and Prior BGs.

In case 1, the ALG determines that there exists a visited-realm or secondary-realm instance for the media line in the received SDP offer that does not match the incoming IP realm for that media line but does match the IP realm to be used for the media line in the forwarded SDP offer. The ALG shall (1) replace the connection and port information for the media line in the SDP offer with the connection and port information from the earliest visited-realm or secondary-realm instance associated with the outgoing IP realm; (2) delete every visited-realm or secondary-realm instance with realm-number value higher than the one used to populate the outgoing connection and port data; and (3) forward the modified SDP offer (at steps 217, 219 and 221).

An example of case 1, using FIG. 1 as a reference, is that upon receiving an SDP offer from the direction of UA1, ALG3 determines that R4 and R1 are instances of the same IP realm. ALG3 substitutes the connection and port information from UA1 into the outgoing SDP offer and deletes the visited-realm instances for R2 and R3 from the SDP before forwarding. After the end-to-end SDP offer/answer transaction is completed, the media path will bypass BG1, BG2, and BG3.

SDP Offer Case 2: Bypass Controlled BG

In case 2 (bypass only the controlled BG), the ALG determines that the outgoing IP realm is accessible from the incoming IP realm represented by the IP connection and port information for the media line in the received SDP offer. If there is a visited-realm or secondary-realm instance for the incoming IP realm that matches the media line in the received SDP offer (not necessarily matching the incoming connection information), the ALG shall forward the received SDP offer without change. Otherwise the ALG shall construct a new visited-realm instance from the connection and port information for the media line in the incoming SDP offer and shall add this visited-realm instance to the SDP offer before forwarding (at steps 217-221).

For case 2, the received SDP offer will normally include a visited-realm or secondary-realm instance that matches the incoming IP realm unless the previous ALG does not support the BG bypass procedures. Adding this missing information provides for more opportunities to perform BG bypass.

SDP Offer Case 3: Bypass Prior BGs

In case 3, the ALG determines that a BG under its control has access both to the outgoing IP realm and to an IP realm other than the incoming IP realm that matches a prior visited-realm or secondary-realm instance for a media line in the received SDP offer. The ALG:

1. shall use the connection and port information from the earliest visited-realm or secondary-realm instance accessible from the BG as the remote connection and port information for the side of the BG directed towards the source of the received SDP offer;

2. shall replace the connection and port information for the media line in the SDP offer with the connection and port information from the side of its BG directed toward the recipient of the forwarded SDP offer;

3. shall delete from the SDP answer every visited-realm and secondary-realm instance with realm-number higher than realm-number for the earliest visited-realm or secondary-realm instance accessible from the BG;

4. may, if the ALG requires that its BG remain in the media path, remove all visited-realm and secondary-realm instances from the SDP offer;

5. should, if the outgoing IP realm does not match any of the visited-realm or secondary-realm instances in the SDP offer, add to the SDP offer a visited-realm instance for the IP realm associated with the connection and port information for the media line in the modified SDP offer;

6. may add to the SDP offer a secondary-realm instance for each IP realm that does not match any other visited-realm or secondary-realm instance for the media line but for which there is a BG controlled by the ALG that has access both to this IP realm and to the incoming IP realm associated with the BG previously allocated by this ALG; and 7. shall forward the modified SDP offer (at steps 217, 219 and 221).

An example of case 3, using FIG. 1 as reference, is that upon receiving an SDP offer from the direction of UA1, ALG4 determines that BG4 has access to R2. ALG4 substitutes its BG connection and port information into the SDP offer, uses the connection and port information from the visited-realm instance for R2 as the remote connection and port information for the UA1 side of BG4, deletes the visited-realm instances for R3 and R4 from the SDP offer, and adds the visited-realm instance for R5 before forwarding. After the end-to-end SDP offer/answer transaction is completed, the media path will bypass BG2 and BG3.

SDP Offer Case 4: Bypass No BGs

The ALG:

1. Should, if there is no visited-realm or secondary-realm instance that matches the IP realm associated with the media line in the received SDP offer and the ALG allows bypass of its BG, construct a new visited-realm instance from the connection and port information for the media line in the incoming SDP offer and add this visited-realm instance to the SDP offer to be forwarded;

2. Shall replace the connection and port information for the media line in the SDP offer with the connection and port information from the side of its BG directed toward the outgoing IP realm;

3. May, if the ALG requires that its BG remain in the media path, remove all visited-realm and secondary-realm instances from the SDP offer;

4. Should, if the outgoing IP realm does not match any of the visited-realm or secondary-realm instances in the SDP offer, add a visited-realm instance for the IP realm associated with the connection and port information for the media line in the forwarded SDP offer;

5. May add to the SDP offer a secondary-realm instance for each IP realm that does not match any other visited-realm or secondary-realm instance for the media line but for which there is a BG controlled by the ALG that has access both to this IP realm and to the IP realm associated with the received SDP offer; and 6. Shall forward the modified SDP offer (at steps 217, 219 and 221).

If the ALG is not performing hosted NAPT traversal on the side towards the source of the received SDP offer, the ALG shall use the connection and port information from the incoming SDP offer as the remote connection and port information for the side of the BG directed towards the source of the received SDP offer. If the ALG is performing hosted NAPT traversal on the side towards the source of the received SDP offer, the ALG/BG may discover the IP address of the RG via latching or other unspecified technique. Except for the insertion of the visited-realm and secondary-realm instance(s) in the outgoing SDP offer, case 4 corresponds to standard ALG behavior.

ALG Handling of SDP Answer in Base Algorithm

Figure 6:
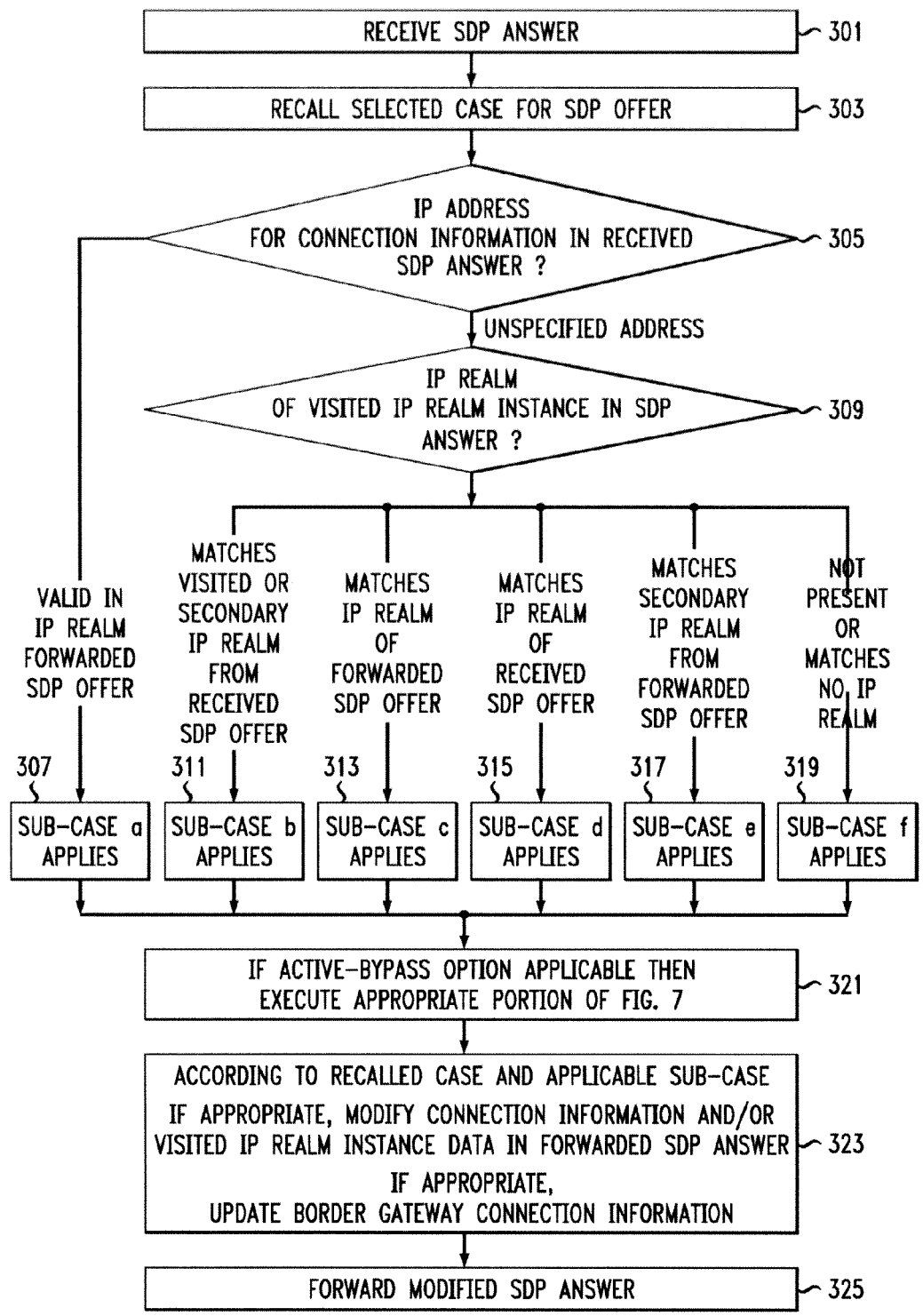
FIG. 6 is a flow diagram illustrating another embodiment of the method according to the present invention.

FIG. 6 illustrates the processing of the SDP answer in the base algorithm of the invention. The method begins after forwarding an SDP offer (at step 221, FIG. 5).

The ALG shall keep information about which of the four cases it selected for handling of BG bypass and which visited-realm and secondary-realm instances it received and added to the forwarded SDP offer. The ALG uses this information in the processing of the corresponding SDP answer (at steps 301, 303), but there are additional sub-cases to be considered since downstream ALGs can also bypass BGs already traversed through, and other ALGs in the path may or may not support the BG bypass procedures. Note that there is at most one identified instance of each IP realm (as represented by a visited-realm or secondary-realm instance) in the SDP offer that reaches its final destination. The ALG uses this fact to correctly process the SDP answer. Unidentified IP realms represent lost opportunities for BG bypass.

To help distinguish the additional sub-cases when processing the SDP answer, the ALG shall insert into the connection information for the media line in the forwarded SDP answer either: 1) a valid IP address for the corresponding IP realm or 2) an unspecified address. For this purpose, the unspecified address for IPv4 is '0.0.0.0' and for IPv6 is a domain name within the ".invalid" DNS top level domain (rather than the IPv6 unspecified address '0::0'). When signaling the unspecified address for the connection information, the port information must have a non-zero value.

The ALG must consider the following sub-cases when receiving an SDP answer (at step 305):

a. The connection and port information for the media line in the SDP answer received by the ALG is *valid* for its IP realm. This IP realm matches the IP realm associated with the connection and port information for the corresponding media line in the SDP offer forwarded by the ALG (at step 307).

b. The connection information for the media line in the SDP answer received by the ALG is the *unspecified address*. The visited-realm instance in the SDP answer matches a visited-realm or secondary-realm instance previously *received* in the SDP offer (at steps 309, 311).

c. The connection information for the media line in the SDP answer received by the ALG is the *unspecified address*. The visited-realm instance in the SDP answer matches the IP realm associated with the connection and port information for the corresponding media line in the SDP offer *forwarded* by the ALG, and sub-case b does not apply ((at steps 309, 313).

d. The connection information for the media line in the SDP answer received by the ALG is the *unspecified address*. The visited-realm instance in the SDP answer matches the IP realm associated with the connection and port information for the corresponding media line in the SDP offer *received* by the ALG, and sub-cases b and c do not apply (at steps 309, 315).

e. The connection information for the media line in the SDP answer received by the ALG is the *unspecified address*. The visited-realm instance in the SDP answer matches the IP realm associated with a secondary-realm instance previously inserted by the ALG in the forwarded SDP offer, and sub-cases b, c and d do not apply (at steps 309, 317).

f. The connection information for the media line in the SDP answer received by the ALG is the *unspecified address*. Sub-cases b, c, d and e do not apply (at steps 309, 319).

Note that after completing the processing for the appropriate sub-case, the ALG may release any BG resources no longer used by the resulting media path.

SDP Answer Sub-Case a: Valid Connection Information

In sub-case a, the ALG receives connection information for the media line in the SDP answer that corresponds to a valid IP address in its IP realm. The ALG behavior depends on which SDP offer case it selected when forwarding the SDP offer (at steps 323 and 325):

In case 1, since the ALG bypassed its BG and at least one prior BG when forwarding the SDP offer, the ALG must forward an SDP answer containing the unspecified address to signal that the ALG receiving the forwarded SDP answer controls a BG that is to be bypassed. The ALG shall construct a new visited-realm instance from the connection and port information for the media line in the incoming SDP answer, shall add this visited-realm instance to the SDP answer, replacing any other visited-realm instances that may appear in the SDP answer, shall replace the connection information for the media line in the SDP answer with the unspecified address, and shall forward the modified SDP answer.

In case 2, since the ALG already bypassed its BG and no others in the SDP offer, it shall forward the received SDP answer with no changes.

In case 3, since the ALG already bypassed at least one prior BG in the SDP offer, but did not bypass its own BG, the forwarded SDP answer must contain the unspecified address to signal that the ALG receiving the forwarded SDP answer controls a BG that is to be bypassed. The ALG shall construct a new visited-realm instance from the local connection and port information for the side of the BG directed towards the source of the received SDP offer, may add this visited-realm instance to the SDP answer, shall replace the connection information for the media line in the SDP answer with the unspecified address, and shall forward the modified SDP answer.

In case 4, since the ALG does not bypass any BGs, the ALG shall replace the connection and port information for the media line in the SDP answer with the local connection and port information for the side of its BG directed toward the source of the received SDP offer, and shall forward the modified SDP answer.

In addition, when the controlled BG remains allocated, as in cases 3 and 4 with sub-case a, if the ALG is not performing hosted NAPT traversal on the side towards the outgoing IP realm, the ALG shall use the connection and port information from the incoming SDP answer as the remote connection and port information for the side of the BG directed towards the outgoing IP realm. If the ALG is performing hosted NAPT traversal on the side towards the source of the received SDP answer, the ALG/BG may discover the IP address of the RG via latching or other unspecified technique.

SDP Answer Sub-Case b: Match on Other IP Realm

In sub-case b, the ALG receives an unspecified address in the connection information for the media line in the SDP answer. The visited-realm instance in the SDP answer matches a visited-realm or secondary-realm instance previously *received* by the ALG in the SDP offer. Regardless which case 1-4 the ALG previously applied to the SDP offer, the ALG is not required to provide a BG for the media path. The ALG shall forward the SDP answer with no changes (at steps 323 and 325).

SDP Answer Sub-Case c: Match on Forwarded SDP Offer

In sub-case c, the ALG receives an unspecified address in the connection information for the media line in the SDP answer. The visited-realm instance in the SDP answer matches the IP realm associated with the connection and port information for the corresponding media line in the SDP offer *forwarded* by the ALG, and sub-case b does not apply. The ALG behavior depends on which SDP offer case it selected when forwarding the SDP offer (at steps 323 and 325):

Sub-case b applies exclusively to case 1.

In case 2, since the ALG already bypassed its BG and no others in the SDP offer, the visited-realm instance in the received SDP answer also matches the IP realm associated with the connection and port information for the corresponding media line in the SDP offer *received* by the ALG. The ALG shall replace the connection and port information for the media line in the SDP answer with the connection and port information from the visited-realm instance in the received SDP answer, shall delete the visited-realm instance from the SDP answer, and shall forward the modified SDP answer.

In case 3, since the ALG already bypassed at least one prior BG in the SDP offer, but did not bypass its own BG, the forwarded SDP answer must contain the unspecified address to signal that the ALG receiving the forwarded SDP answer controls a BG that is to be bypassed. The ALG shall replace the visited-realm instance for the media line in the SDP answer with a new visited-realm instance constructed from the local connection and port information for the side of the BG directed towards the source of the received SDP offer, shall retain the unspecified address in the connection information for the media line in the SDP answer, and shall forward the modified SDP answer.

In case 4, since the ALG does not bypass any BGs, the ALG shall replace the connection and port information for the media line in the SDP answer with the local connection and port information for the side of its BG directed toward the source of the received SDP offer, may delete the visited-realm instance from the SDP answer, and may forward the modified SDP answer.

In addition, when the controlled BG remains allocated, as in cases 3 and 4 with sub-case c, the ALG may use the connection and port information from the visited-realm instance in the received SDP answer as the remote connection and port information for the side of the BG directed towards the source of the received SDP answer.

SDP Answer Sub-Case d: Match on Received SDP Offer

In sub-case d, the ALG receives an unspecified address in the connection information for the media line in the SDP answer. The visited-realm instance in the SDP answer matches the IP realm associated with the connection and port information for the corresponding media line in the SDP offer *received* by the ALG, and sub-cases b and c do not apply. The ALG bypasses its BG in all cases. The ALG behavior depends on which SDP offer case it selected when forwarding the SDP offer (at steps 323 and 325):

Sub-case b applies exclusively to case 1.
Either sub-case b or c applies to case 2.
Sub-case b applies exclusively to case 3.

In case 4, since the ALG did not bypass any BGs when processing the SDP offer, it must now signal the forwarded SDP answer to bypass its own BG. The ALG shall replace the connection and port information for the media line in the SDP answer with the connection and port information from the visited-realm instance for the media line in the received SDP answer, shall delete the visited-realm instance from the SDP answer, and shall forward the modified SDP answer.

SDP Answer Sub-Case e: Match on Own Secondary-Realm

In sub-case e, the ALG receives the unspecified address in the connection information for the media line in the SDP answer. The visited-realm instance in the SDP answer matches a secondary-realm instance previously inserted by the ALG in the SDP offer, and sub-cases b, c and d do not apply. The ALG behavior depends on which SDP offer case it selected when forwarding the SDP offer (at steps 323 and 325):

SDP offer cases 1 and 2 do not apply since the ALG does not insert secondary-realm instances into the SDP offer in these cases.

In case 3, since the ALG already bypassed at least one prior BG in the SDP offer, but did not bypass its own BG, the forwarded SDP answer must contain the unspecified address to signal that the ALG receiving the forwarded SDP answer controls a BG that is to be bypassed. The ALG uses the BG associated with the secondary-realm instance rather than the original BG allocated for the forwarded SDP offer. The ALG shall construct a new visited-realm instance from the local connection and port information for the side of the secondary BG directed towards the source of the received SDP offer, shall add this visited-realm instance to the SDP answer, shall replace the connection information for the media line in the SDP answer with the unspecified address, and shall forward the modified SDP answer.

In case 4, since the ALG does not bypass any BGs, the ALG shall replace the connection and port information for the media line in the SDP answer with the local connection and port information for the side of its secondary BG directed toward the source of the received SDP offer, and shall forward the modified SDP answer.

In addition, since the secondary BG remains allocated for this sub-case, if the ALG is not performing hosted NAPT traversal on the side towards the outgoing IP realm, the ALG shall use the connection and port information from the incoming SDP answer as the remote connection and port information for the side of the BG directed towards the outgoing IP realm. If the ALG is performing hosted NAPT traversal on the side towards the source of the SDP answer, the ALG/BG must discover the address of the RG via latching or other unspecified technique.

SDP Answer Sub-Case f: No Match

In sub-case f, the ALG receives an unspecified address in the connection information for the media line in the SDP answer, and sub-cases b, c, d and e do not apply. Since either there is no visited-realm instance or the instance does not match any of the listed cases, then either the unspecified address comes from the endpoint sending the SDP answer or the active-bypass option has been invoked by another ALG. In all cases 1-4, the ALG shall forward the SDP answer with no changes (at steps 323 and 325).

ALG Procedures for Active-Bypass Option

Figure 7:
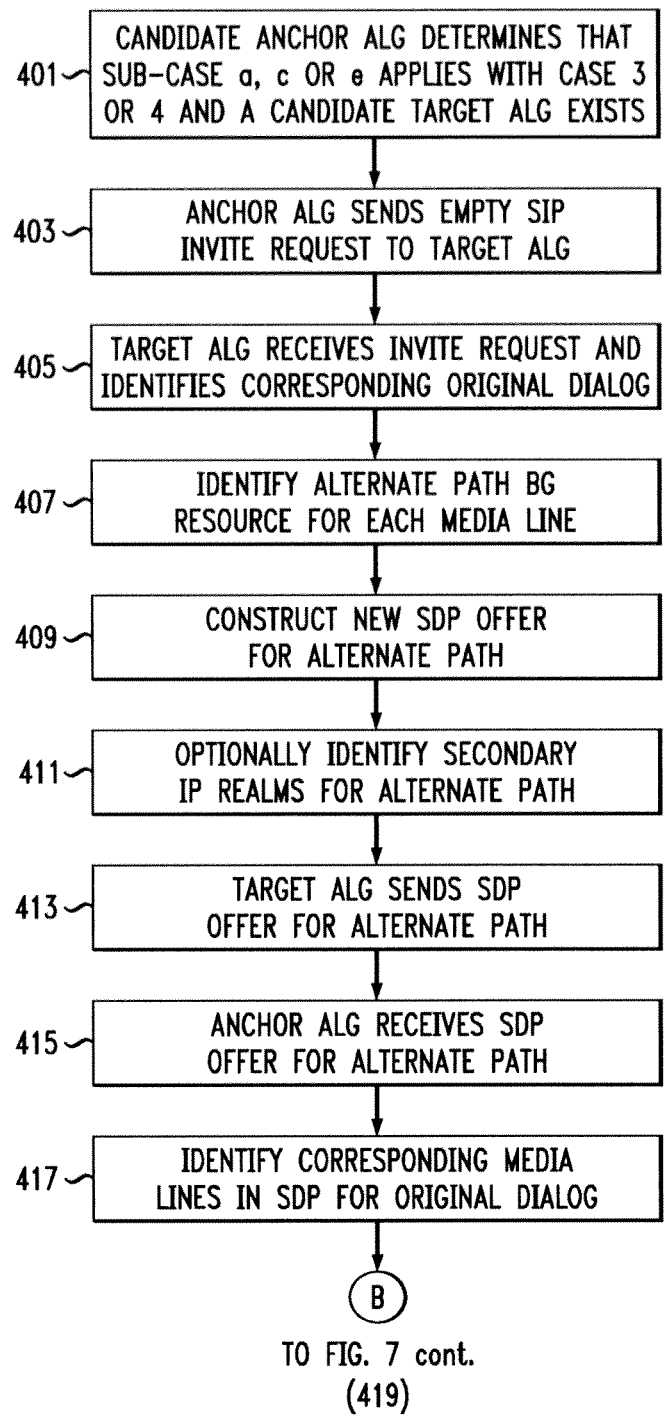
Figure 7:
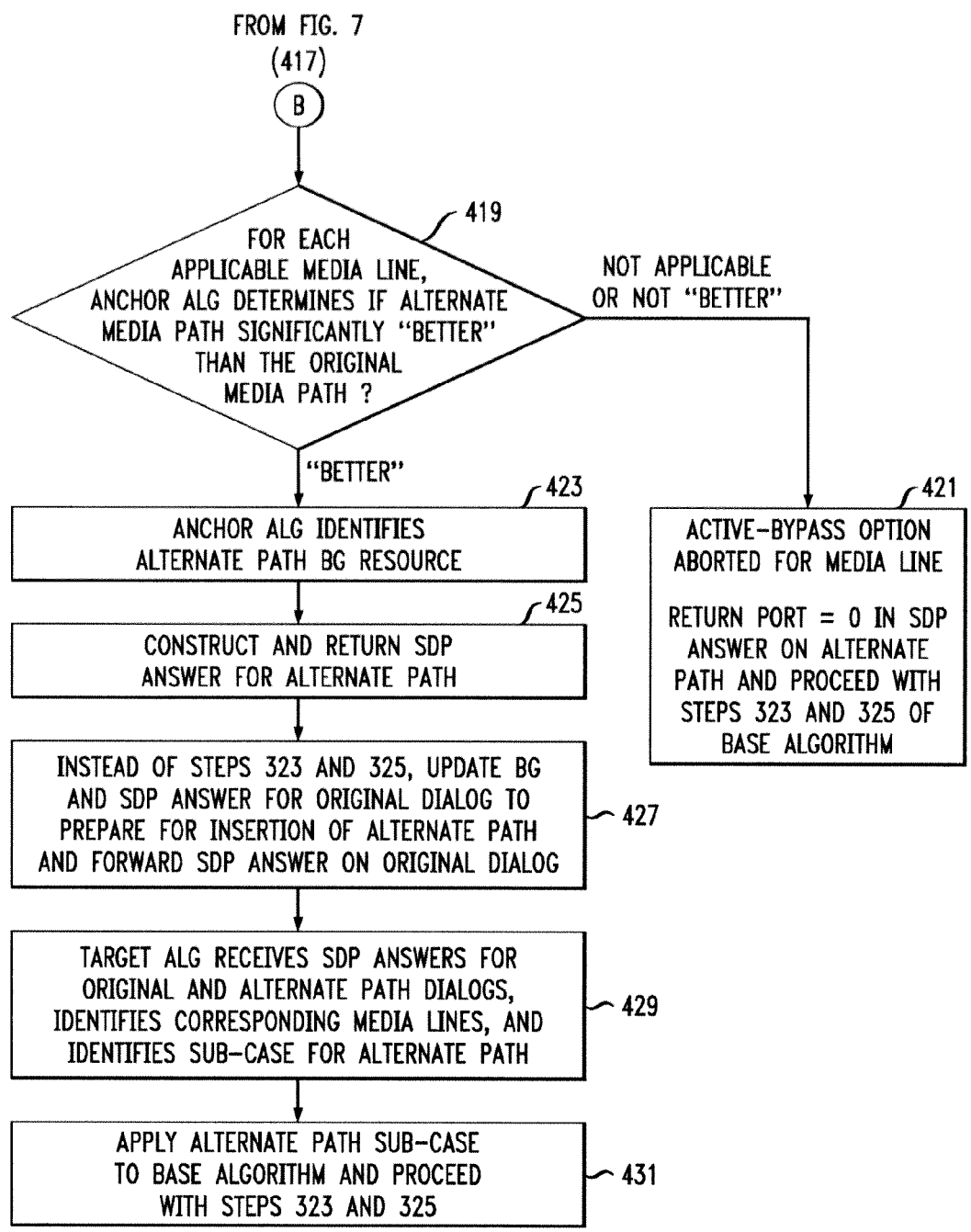

FIG. 7 illustrates the processing of the active-bypass option of the invention. During the processing of the SDP answer in the base algorithm, any ALG that still retains a BG in the media path (i.e., SDP answer sub-cases a, c or e with SDP offer cases 3 or 4) may choose to perform the active-bypass option as a candidate anchor ALG for an alternate media path segment (at step 321 in FIG. 6 and step 401 in FIG. 7). The candidate anchor ALG contacts the best candidate target ALG to mutually determine if a superior media path segment is available.

Anchor ALG Sends an Alternate Path Request

Each ALG handling one of SDP answer sub-cases a, c or e with SDP offer case 3 or 4 may examine the information within visited-realm and secondary-realm instances previously received in the SDP offer to determine if there is a possibility that a significantly "better" remaining path can be constructed than the one already determined by the base algorithm (at step 401). In particular, the ALG examines the location, delay and loss data from its BG back to the earliest ALG reachable via a GRUU to make this determination. The method of using the information to identify better paths and the threshold of improvement required (given the extra signaling needed for the active-bypass option) is a matter of local policy.

For example, if the earliest ALG reachable via a GRUU controls a BG that is geographically close to the BG controlled by the determining ALG, yet there are other visited-realm or secondary-realm instances on the path between them that are geographically distant from them, then there is good reason to expect that a better media path segment exists.

If a possible "better" path exists for one or more SDP media lines to the same earlier ALG, the determining ALG (now called the anchor ALG) shall send a SIP INVITE request without SDP to the earlier ALG (now called the target ALG) (at step 403). This INVITE request is called an alternate path request. This alternate path request will, if successful, result in an alternate path dialog and one or more alternate media path segments, if they have not already been established by earlier alternate path requests. This is in contrast to the original dialog, for which the anchor ALG is still processing the SDP answer.

If an alternate path dialog associated with the original dialog already exists between the anchor and target ALGs, the alternate path request shall comprise a re-INVITE request within the existing alternate path dialog. This may occur, for example, if a previous SDP offer/answer transaction has already completed within the original dialog. Otherwise the alternate path request shall comprise a new INVITE request, placing the GRUU of the target ALG in the Request-URI and the GRUU of the anchor ALG in the From and P-Asserted-Identity headers.

According to normal IMS routing procedures, the alternate path request may traverse one or more ALGs on its path to the target ALG. If the alternate path request fails prematurely with any non-success final response, the anchor ALG should abort the active-bypass option and continue handling of the SDP answer within the original dialog according to the base algorithm.

Target ALG Processing of Alternate Path Request

Upon receipt of an alternate path request in a new INVITE request, the target ALG shall identify the corresponding original dialog via the unique value of the GRUU in the Request-URI. Upon receipt of an alternate path request in a re-INVITE request, the target ALG shall identify the associated alternate path dialog and its corresponding original dialog. The target ALG uniquely identifies either request as an alternate path request associated with the original dialog since the assigned GRUU is the only address for which the target ALG will establish a corresponding alternate path dialog (at step 405).

For each SDP media line in the previously forwarded SDP offer within the original dialog for which SDP offer case 3 or 4 has been applied (i.e., the target ALG has allocated a BG for the media line), the target ALG shall determine the IP realm associated with the alternate path request. Then for each applicable media line, the target ALG shall determine whether the BG resource(s) allocated during the processing of the SDP offer for the original dialog has access to the IP realm associated with the alternate path request. If so, then the BG resource can be re-used, else the target ALG must allocate a new BG resource (at step 407).

Then the target ALG shall construct a new SDP offer from the SDP offer forwarded within the original dialog by:

1. copying the original SDP offer;
2. modifying the o line as appropriate;
3. deleting all visited-realm and secondary-realm instances;
4. constructing the visited-realm information for each applicable media line;
5. inserting the corresponding connection and visited-realm instance information for each applicable media line; and
6. setting port value to zero for all other media lines (at step 409).

For each applicable media line in the new SDP offer, if BG resources are available with access to additional IP realms as well as access to the IP realm previously selected for the portion of the bearer path towards the source of the original SDP offer, the target ALG may construct the corresponding secondary-realm instances and add them to the media line (at step 411).

Then the target ALG shall send the constructed SDP offer to the anchor ALG in the SIP 200 OK response message according to normal SIP procedures (at step 413). If the alternate path request received by the target ALG traversed one or more ALGs on its path from the anchor ALG, this new SDP offer will also traverse the same ALGs, which will recursively apply the base algorithm and optionally the active-bypass option to the SDP offer.

If an error such as any of the following occurs during the processing of the alternate path request, the target ALG responds with an appropriate SIP final error response:

The target ALG does not recognize the GRUU.
There are no BG resources allocated for any media line in the original SDP offer.
The INVITE request included SDP.

Anchor ALG Processing of SDP Offer from Target ALG

When the anchor ALG receives the SDP offer from the target ALG in the 200 OK response, the anchor ALG shall apply the following procedure independently to each media line in the received SDP offer before returning the corresponding SDP offer in the ACK request towards the target ALG (at step 415).

If the port value is set to zero in the media line, the anchor ALG shall set the port value to zero in the corresponding media line in the SDP answer to be sent towards the target ALG and shall proceed with the base algorithm (i.e., the active-bypass option has no impact on the base algorithm for this media line).

If the media line has a non-zero port value, then the anchor ALG shall attempt to identify the corresponding media line in the original SDP answer (at step 417). There is a possibility that the order of the media lines in the received SDP offer is different from the order of the media lines in the original SDP answer due to intermediate applications performing 3rd party call control procedures to split/merge SDP media lines. If there is a visited-realm or secondary-realm instance in the received SDP offer with a GRUU for the target ALG, then this can be matched against the GRUU received for the target ALG in the original SDP offer to identify the corresponding media line. If no GRUU is present to assist in matching media lines, the anchor ALG may be able to uniquely match the media lines based on other information, e.g., only one applicable media line is common to both the original and alternate path dialogs.

If the anchor ALG cannot identify the corresponding original media line for a received media line with a non-zero port value, the anchor ALG shall set the port value to zero in the corresponding media line in the SDP answer to be sent towards the target ALG.

If the anchor ALG can identify the corresponding original media line for a received media line with a non-zero port value, the anchor ALG should use available visited-realm and secondary-realm instance information in the received SDP offer and may use other unspecified data to determine if the alternate media path segment is significantly "better" than the corresponding portion of the original media path (at step 419). The algorithm used to assess the quality of each media path segment and to determine the minimum threshold of significance is a matter of local policy.

If the anchor ALG determines that the alternate media path segment is not significantly better than the corresponding portion of the original media path, the anchor ALG shall set the port value to zero in the corresponding media line in the SDP answer to be sent towards the target ALG and shall proceed with the base algorithm (at step 421).

If the anchor ALG determines that the alternate media path segment is significantly better than the corresponding portion of the original media path, the anchor ALG:

1. Shall allocate BG resources for the IP realm associated with the alternate media path segment, if not already available (at step 423);
2. Shall set the connection information and/or visited-realm attribute for the corresponding media line in the SDP answer in the alternate path dialog according to the recursive application of the base algorithm by choosing SDP offer case 3 or 4 according to the processing of the received media line from the alternate path dialog and by applying SDP answer sub-case a, c or e from the processing of the original SDP answer (at step 425); and
3. Shall modify the processing of the original SDP answer in the base algorithm as follows (at step 427).

For the corresponding media line of the SDP answer received during the course of the base algorithm, the anchor ALG:

1. Shall select the remote connection and port information for the side of the BG directed towards the source of the received SDP answer according to the SDP offer case applied to the media line in the alternate path dialog and the applicable original SDP answer sub-case;
2. Shall delete any visited-realm instance for the media line in the SDP answer;
3. Shall construct a new visited-realm instance for the special IP realm "NOMATCH" including the GRUU of the media line received from the target ALG, if available;
4. Shall add this visited-realm instance to the SDP answer;
5. Shall replace the connection information for the media line in the SDP answer with the unspecified address; and
6. Shall forward the modified SDP answer within the original dialog.

Other ALG Processing of SDP Answer in Original Dialog

After the anchor ALG forwards the original SDP answer, every other conformant ALG on the signaling path prior to the target ALG will forward the SDP answer without change according to SDP answer sub-case f of the base algorithm.

Target ALG Processing of SDP Answers

Upon receipt of the SDP answer within the original dialog, recognizing that it has recently received and responded to an alternate path request for this media line (and possibly others), the target ALG:

1. Shall determine if SDP answer sub-case f applies with special IP realm "NOMATCH" in the corresponding visited-realm attribute (if one is present);
2. Shall verify that the corresponding media line for the alternate path dialog is to be associated with this original media line, using either the GRUU in the received visited-realm attribute or other unspecified means;
3. Shall determine if the SDP answer for the alternate path dialog is received (in the ACK request) in a reasonable amount of time;
4. Shall determine if the port for the corresponding media line for the alternate path dialog has non-zero value and
5. Shall determine that SDP answer sub-case a, c or e applies to the corresponding media line for the alternate path dialog (at step 429).

If any of the above conditions do not apply, then the target ALG should continue with the normal processing of the base algorithm and mark the media line for the alternate path request as "unused". Note that some combinations of conditions (representing error cases) will fail to establish an end-to-end media path. If this occurs, the target ALG should reject subsequent alternate path requests within the original dialog and MAY apply other unspecified recovery actions.

If all of the above conditions apply, the target ALG shall apply the applicable SDP offer case 3 or 4 and the applicable SDP answer sub-case a, c or e for the corresponding media line for the alternate path dialog to configure the BG and modify the received SDP answer or the original dialog before forwarding the SDP answer (at step 431).

The net result of the successful application of the active-bypass option is to replace the portion of the end-to-end media path generated by the base algorithm between the target and anchor ALGs with the alternate media path segment generated by the alternate path request.

Release of Alternate Path Dialog

The target ALG and anchor ALG SHOULD release the alternate path dialog and associated resources not otherwise needed using standard SIP procedures when either the original dialog is released or when all of the media lines for the alternate path dialog either have port value zero or are marked "unused".

If the alternate path dialog is released while in use to maintain an alternate media path segment, the anchor ALG and target ALG MAY release the corresponding original dialog or perform other unspecified recovery actions.

Special Handling of Unspecified Address from Endpoints

If the UA initiating an SDP offer includes an unspecified address in the connection information, the unspecified address shall be associated with the IP realm of the UA. The ALG shall follow case 1 when forwarding an SDP offer with an unspecified address, where it is understood that the SDP offer contains an implicit visited-realm instance with the unspecified address for every IP realm. The net result of this procedure is that if there is an unspecified address in the initial SDP offer, every ALG will forward an unspecified address. If the received SDP answer includes a valid IP address, it will be transformed into an unspecified address by the first ALG using sub-case a, and subsequent ALGs will include the unspecified address in the forwarded SDP answer using a sub-case b through f. Since this procedure does not support the use of a "black hole" address that is available for use in SIP third party call control (3 pcc) procedures to discover the connection information for the answering UA, there are some limitations to the applicability of these procedures, although none of the recommended 3 pcc procedures depend on the use of the "black hole" address.

If the UA initiating an SDP answer includes an unspecified address in the connection information, the ALG procedures for handling of SDP answers remain unchanged, with the result that if any BGs were allocated when forwarding SDP offers, they will all be released. Each ALG shall treat an SDP answer with an unspecified address but without an explicit visited-realm instance as if it contains a single implicit visited-realm instance for an unknown IP realm, Thus sub-case f always applies.

Note that if the initial SDP offer or initial SDP answer includes an unspecified address in the connection information, there can be no media flow until a subsequent SDP offer/answer transaction is performed using actual IP addresses from the endpoint IP realms.

Assumptions about Non-Compliant ALGs

A non-compliant ALG will usually delete unknown SDP attributes before forwarding SDP offers or answers. Such an ALG will delete any visited-realm or secondary-realm instances from the SDP offer before allocating a BG and forwarding the SDP offer, making it impossible for subsequent ALGs to bypass the allocated BG. Optimizations can still be applied independently to the portions of the end-to-end media path before and after the non-compliant ALG to successfully establish the end-to-end media path via the BG allocated by the non-compliant ALG.

If a non-compliant ALG in a session signaling path does forward visited-realm and secondary-realm attributes after BG allocation, compliant ALGs retain most opportunities for BG bypass while establishing the end-to-end media path if the non-compliant ALG exhibits the following behaviors:

When receiving an SDP message with an unspecified address in the connection information, the non-compliant ALG retains the unspecified address in the forwarded SDP message.

If the ALG both converts an unspecified address into a valid address and forwards visited-realm attributes, then the procedures may fail to establish a media path. The ALGs bordering a non-compliant ALG known to do this MAY implement a work-around by manipulating the signaling to keep the non-compliant ALG in the media path, although this forfeits significant opportunities for BG bypass.

To keep a neighbor ALG in the path, a compliant ALG selects an applicable case or sub-case from the detailed procedures that ensures that real connection information is provided in all SDP messages destined to the neighbor ALG and to delete all visited-realm attributes in SDP messages destined to or coming from the neighbor ALG.

A non-compliant ALG will not terminate a session for which there is no media flow in its BG. The ALG must implicitly accept that its BG may be bypassed. The ALGs bordering a non-compliant ALG that is known to violate this assumption MAY implement a work-around by manipulating the signaling to keep the non-compliant ALG in the media path, although this forfeits significant opportunities for BG bypass.

The Visited-Realm and Secondary-Realm Attributes

The visited-realm and secondary-realm SDP attributes are media-level attributes only. The visited-realm attribute contains an IP realm identifier and transport address for a previously traversed through realm that can potentially be used to bypass allocated BGs. The secondary-realm attribute contains an IP realm identifier and transport address for a secondary realm that can potentially be used to bypass allocated BGs.

The syntax of these attributes is defined using Augmented BNF as defined in RFC 4234, Crocker, D. and P. Overell, "Augmented BNF for Syntax Specifications: ABNF", October 2005:

visited-realm="visited-realm" ":" realm-number SP
  realm SP
  transport SP
  connection-address SP; from RFC 4566
  port; from RFC 4566
  [SP rtcp-port [SP rtcp-address]]
  [SP coordinates]
  [SP delay]
  [SP loss]
  [SP temp-gruu]
  [SP credentials]
  *(SP extension-att-name SP
  extension-att-value)
secondary-realm="secondary-realm" ":" realm-number SP
  realm SP
  transport SP
  connection-address SP; from RFC 4566
  port; from RFC 4566
  [SP rtcp-port [SP rtcp-address]]
  [SP coordinates]
  [SP delay]
  [SP loss]
  [SP temp-gruu]
  [SP credentials]
  *(SP extension-att-name SP
  extension-att-value)
realm-number=1*DIGIT
realm=non-ws-string from RFC 4566
transport="UDP"/transport-extension
transport-extension=token; from RFC 3261
rtcp-port="rtcp-port" SP port
rtcp-address="rtcp-address" SP connection-address
coordinates="coordinates" SP geo-location
  ; from draft-mayrhofer-geopriv-geo-uri
delay="delay" SP delay-value
delay-value=1*DIGIT
loss="loss" SP loss-value
loss-value="-" 1*DIGIT ["." 1*DIGIT]
temp-gruu="temp-gruu" SP SIP-URI from RFC 3261
credentials="credentials" SP credentials-value
credentials-value=non-ws-string
extension-aft-name=token
extension-att-value=non-ws-string This grammar encodes the primary information about each visited-realm and secondary-realm instance: the sequence in which the realm was traversed through, the realm identity, its IP address, port and transport protocol, and optional geo-location, IP packet delay, IP packet loss, temporary-GRUU and security credentials:

<realm-number>: For a visited-realm instance, realm-number is a positive decimal integer between 1 and 256 which identifies the sequence in which this visited-realm instance was traversed through during the forwarding of an SDP offer, compared to other visited-realm instances for the media line in the same SDP offer. It must start at 1 and must increment by 1 compared to the highest existing realm-number for the media line when inserting a new visited-realm instance into an SDP offer. The realm-number can be ignored in an SDP answer since there should only be one visited-realm instance and no secondary-realm instance in an SDP answer. It is recommended that the realm-number have value 1 in an SDP answer. For a secondary-realm instance in a forwarded SDP offer, realm-number must have the same value as the realm-number for the visited-realm instance created for the same media line by the same ALG for the connection information in the forwarded SDP offer.

<realm>: identifies a set of mutually reachable IP endpoints that share a common IP addressing scheme. Each realm also defines a protection domain for all hosts using visited-realm or secondary-realm attribute instances for the realm, to help ensure the integrity of the remaining information in each attribute instance. A public address reachable from the open internet may be associated with the special realm "IN", for which no credentials are required. The special realm "NOMATCH" is used to signify a realm only reachable via an alternate media path segment created by the active-bypass option. Operators of ALGs that wish to ensure the integrity of the visited-realm instance information for their realm(s) must adhere to the following guidelines for creation of a realm string for their servers: (1) Realm strings must be globally unique. It is recommended that a realm string contain a hostname or domain name, following the recommendation in Section 3.2.1 of RFC 2617. (2) Realm strings should present a human-readable identifier that can be rendered to a user.

<transport>: indicates the transport protocol for the visited-realm instance. This specification only defines UDP. However, extensibility is provided to allow for future transport protocols to be used with these procedures, such as TCP or the Datagram Congestion Control Protocol (DCCP).

<connection-address>: is taken from RFC 4566. It is the IP address associated with the visited-realm instance, allowing for IPv4 addresses, IPv6 addresses and FQDNs. An IP address SHOULD be used, but an FQDN MAY be used in place of an IP address. When receiving an offer or answer containing an FQDN in an a=visited-realm attribute, if there is a match on the realm according to the procedures herein, the FQDN is looked up in the DNS using an A or AAAA record, and the resulting IP address is used for the remainder of the procedure.

<port>: is also taken from RFC 4566. It is the port associated with the visited-realm instance.

<rtcp-port> and <rtcp-address>: taken together are semantically equivalent to the rtcp attribute defined in RFC 3605. They optionally encode the RTCP port and address information when the visited-realm instance is for an RTP stream and the RTCP port number is not exactly one greater than the port for the RTP stream at the same address.

<coordinates>: provides the approximate geographic coordinates of the BG or endpoint associated with the connection information in the visited-realm or secondary-realm attribute according to known geo-location syntax. The coordinates need only be accurate enough to estimate the minimum IP packet propogation delay between successive BGs/endpoints based on distance. The ALG should include known coordinates for each visited-realm or secondary-realm attribute in a forwarded SDP offer. The procedures described herein do not require the use of coordinates in SDP answers.

<delay-value>: is an estimate of the delay in transporting IP packets between the controlled BG and the next BG or endpoint towards the source of the received SDP offer (through the previous IP realm). delay-value is a positive decimal integer representing the delay in milliseconds. The ALG should include delay-value for each visited-realm or secondary-realm attribute in a forwarded SDP offer if the information is available and is significantly different from an estimated minimum value based on the coordinates of the respective BGs/endpoints. The procedures described herein do not require the use of delay-value in SDP answers.

<loss-value>: is an estimate of the rate of IP packet loss on the link between the controlled BG and the next BG or endpoint towards the source of the received SDP offer. loss-value is equal to log(packet-loss-rate) in negative decimal format, where packet-loss-rate is the average ratio of lost IP packets to all IP packets sent on the link. The packet-loss-rate can be reconstructed as 10**(loss-value). The ALG should include loss-value for each visited-realm or secondary-realm attribute in a forwarded SDP offer if the information is available. The procedures described herein do not require the use of loss-value in SDP answers.

<temp-gruu>: is a temporary GRUU assigned uniquely by each ALG for a specific dialog and media line. For each media line in a forwarded SDP offer, if the ALG supports the target ALG procedures of the active-bypass option, is reachable via a globally unique host name, and controls the BG associated with the connection information for the media line in the forwarded SDP offer, the ALG SHOULD include a temp-gruu in the corresponding visited-realm attribute generated by the ALG. See the active-bypass option procedures for use of the temp-gruu in an SDP answer. The procedures described herein do not require the use of temp-gruu in the secondary-realm attribute.

<credentials-value>: is a digital signature computed on the other contents of the attribute and other secret data. The authority for the protection domain associated with the realm may choose MD5 or other algorithm to compute the credentials. For additional security, extension attributes (such as nonce and opaque used for digest) may be used to link the credentials calculated on the attribute in one SDP message to prior SDP offers or answers used within a SIP dialog. Only servers within the protection domain need to verify the integrity of the attribute contents.

The candidate attribute can itself be extended. The grammar allows for new name/value pairs to be added at the end of the attribute. An implementation must ignore any name/value pairs it does not understand.

Since the connection and port information in an instance of the visited-realm attribute can only be used by a trusted node within the corresponding IP realm, the realm may choose to put encrypted versions of the connection-address and port information into the extension parameters while putting dummy values into the connection-address and port fields.

Security Considerations

The use of this extension is only applicable inside a 'Trust Domain' as defined in RFC 3325, Jennings, C., Peterson, J. and Watson, M., "Private Extensions to the Session Initiation Protocol (SIP) for Asserted Identity within Trusted Network", November 2002. Nodes in such a Trust Domain are explicitly trusted by its users and end-systems to inspect and manipulate SDP messages as necessary to traverse and/or bypass firewalls and NATS while limiting access from unauthorized sources to endpoints in IP realms associated with the Trust Domain.

Since the procedures the procedures disclosed herein include an option to cryptographically certify the candidate connection and port information from each IP realm, they can be used under some circumstances when the signaling traverses non-trusted networks or the Internet at large.

Since the base algorithm in this extension requires no additional signaling outside of an end-to-end SDP offer/answer exchange, it is likely to be impacted by any attack that can modify or disrupt an SDP offer/answer exchange. Such an attack could direct media to a target of a DoS attack, insert a third party into the media stream, and so on. These are similar to the general security considerations for offer/answer exchanges, and the security considerations in RFC 3264 apply. These require techniques for message integrity and encryption for offers and answers, which can be satisfied by the SIPS mechanism or IMS security mechanisms when SIP is used. As such, the usage of hop-by-hop message integrity and encryption with this extension is recommended.

In addition to the above considerations, the active-bypass option in this extension establishes alternate path dialogs and alternate media path segments using GRUUs with values that cannot always be certified. Thus the active-bypass option is generally not recommended for signaling that traverses non-trusted networks or the Internet at large.

Implementation of these various network elements depend on how the system is used. These functions may be performed by some or all of the network elements in conjunction or separate from one another and may be implemented using a variety of hardware configuration and/or software techniques. This method lists but a few embodiments of the proposed system and variations may currently exist. However, this is not meant to limit the claims but instead show some embodiments as to how the method and system may be used.

The above description merely provides a disclosure of particular embodiments of the claimed invention and is not intended for the purposes of limiting the same. As such, the invention is not limited to only the above-described embodiments. Rather, it is recognized that one skilled in the art could conceive alternative embodiments that fall within the scope of the invention.

The invention claimed is:

1. A method for identifying alternative end-to-end media paths through internet protocol realms using substitute session description protocol parameters, the method comprising:
    receiving a first message for establishing or changing a session, including a list of internet protocol realms, wherein the list includes a previously traversed through internet protocol realm on a first media path and a secondary internet protocol realm that is not on the first media path, is accessible from a controlled gateway and has not been previously traversed through;
    determining the outgoing internet protocol realm for a second media path based at least in part on session initiation protocol signaling information;
    if the outgoing internet protocol realm is reachable from the secondary internet protocol realm on the list of internet protocol realms, selecting the secondary realm and bypassing at least one border gateway associated with the secondary internet protocol realm,
    wherein the session description protocol parameters are in an offer message and the method further comprises:
        receiving a session description protocol answer with session description protocol parameters;
        recalling the session description protocol parameter in the offer message; and
        manipulating the session description protocol parameters in the session description protocol answer in order to establish an end-to-end media path that bypasses one or more border gateways.

2. The method according to claim 1, further comprising treating a host behind a network address port translator as if the host was in its own internet protocol realm.

3. The method according to claim 1, further comprising implementing security procedures that remove one or more instances of internet protocol realms from the list of internet protocol realms.

4. The method according to claim 1, wherein the list of internet protocol realms includes realm identifiers in order to distinguish one realm from another.

5. The method according to claim 1, wherein the list of internet protocol realms includes port data and connection data.

6. The method according to claim 5, further comprising implementing a security policy that encrypts the connection data.

7. The method according to claim 1, further comprising providing an algorithm private to each internet protocol realm for the integrity of the list of internet protocol realms.

8. The method according to claim 7, wherein the algorithm includes a cryptographic signature.

9. The method according to claim 1, further comprising adding the internet protocol realm that is associated with an incoming or outgoing message to the list of internet protocol realms.

* * * * *